(12) United States Patent
Pison et al.

(10) Patent No.: US 9,119,059 B2
(45) Date of Patent: *Aug. 25, 2015

(54) METHOD OF CONFIGURING MODULES FOR IDENTIFYING USERS OF A TELECOMMUNICATION NETWORK

(75) Inventors: Laurent Pison, Jouars-Ponchartrain (FR); Olivier Paterour, Guyancourt (FR); Gérard Marque-Pucheu, Verneuil (FR)

(73) Assignee: CASSIDIAN SAS, Elancourt (FR)

(*) Notice: Subject to any disclaimer, the term of this patent is extended or adjusted under 35 U.S.C. 154(b) by 108 days.

This patent is subject to a terminal disclaimer.

(21) Appl. No.: 13/642,220

(22) PCT Filed: Feb. 25, 2011

(86) PCT No.: PCT/EP2011/052858
§ 371 (c)(1),
(2), (4) Date: Oct. 19, 2012

(87) PCT Pub. No.: WO2011/131396
PCT Pub. Date: Oct. 27, 2011

(65) Prior Publication Data
US 2013/0040672 A1 Feb. 14, 2013

(30) Foreign Application Priority Data
Apr. 20, 2010 (FR) ...................................... 10 53011

(51) Int. Cl.
*H04W 4/00* (2009.01)
*H04W 40/00* (2009.01)
*H04W 8/26* (2009.01)

(52) U.S. Cl.
CPC ...................................... *H04W 8/26* (2013.01)

(58) Field of Classification Search
CPC ............................... H04B 1/3816; H04W 8/26
USPC .............. 455/435.1, 518, 555, 558, 446, 449
See application file for complete search history.

(56) References Cited

U.S. PATENT DOCUMENTS

2008/0081592 A1* 4/2008 Das et al. ...................... 455/406
2010/0099412 A1* 4/2010 Ramachandran et al. . 455/435.2
2011/0195700 A1* 8/2011 Kukuchka et al. ......... 455/422.1

(Continued)

FOREIGN PATENT DOCUMENTS

DE 10 2006 023 641 11/2007
WO WO 2006/048051 5/2006

OTHER PUBLICATIONS

International Search Report as issued for PCT/EP2011/052858.

(Continued)

*Primary Examiner* — Simon Nguyen
(74) *Attorney, Agent, or Firm* — Pillsbury Winthrop Shaw Pittman LLP

(57) ABSTRACT

A method of configuring modules for identifying users of a telecommunication network able to cover a service area cut into a plurality of geographical sub areas, each identification module including an identification code stored in the identification module, the identification code including: —an operator identifier; —a user identification number; the method including assigning at least one operator identifier to each geographical sub area, the operator identifiers of two contiguous geographical sub areas being different and at least two non-contiguous geographical sub areas having an identical operator identifier.

12 Claims, 1 Drawing Sheet

(56) References Cited

U.S. PATENT DOCUMENTS

2011/0212729 A1* 9/2011 Li et al. .................. 455/450
2012/0135733 A1* 5/2012 Cormier et al. ............ 455/435.1
2012/0157095 A1* 6/2012 Fodor et al. ................ 455/434
2014/0031035 A1* 1/2014 Tagg et al. .................. 455/433

OTHER PUBLICATIONS

Johnson; "Assignment of Codes for United Nations Disaster Relief Activities"; ITU, May 4, 2007; pp. 1-2; XP002612090.

"Report to ITU Study Group 2: E.164 United Nations Country Code"; IASC Sub-Working Group on Emergency Telecommunications (WGET); Jan. 2007, pp. 1-5; XP002612091.

"ITU-T E.212: International Operation Maritime Mobile Service and Public Land Mobile Service: The International Identification Plan for Public Networks and Subscriptions"; ITU-T Series E: Overall network operation, telephone services, service operation and human factors, ITU-T Recommendation E,212, May 2008; XP002611801, Switzerland, Geneva 2005.

"Terrestrial Trunked Radio (TETRA) Voice plus Data (V+D); Designers guide; Part 5: Guidance on numbering and addressing", Technical Report, European Telecommunications Standards Institute (ETSI), 650, Route Des Lucioles, F-06921 Sophia-Antipolis, France, vol. TETRA 3; No. V1.3,1; Mar. 1, 2010; XP014046262.

"ITU-T E.218: International Operation Maritime Mobile Service and Public Land Mobile Service: Management of Allocation of Terrestrial Trunk Radio Mobile Country Codes", ITU-T Series E; Overall network operation, telephone services, service operation and human factors ITU-T Recommendation E.218, May 2004; XP002612092, Switzerland, Geneva 2004.

* cited by examiner

METHOD OF CONFIGURING MODULES FOR IDENTIFYING USERS OF A TELECOMMUNICATION NETWORK

CROSS REFERENCE TO RELATED APPLICATIONS

This application is the U.S. National Stage of PCT/EP2011/052858, filed Feb. 25, 2011, which in turn claims priority to French Patent Application No. 1053011, filed Apr. 20, 2010, the contents of all applications are incorporated herein by reference in their entireties.

The present invention is situated in the telecommunications field and more specifically relates to a method of configuring modules for identifying users of a telecommunication network whose national operator identification is recognized at the worldwide level through a standard for the purposes of mobility. More particularly, it is registered in 3GPP (GSM, UMTS, LTE, and future technologies), IEEE such as, for example, WiMAX (802.16) or WIFI (802.11) technologies, 3GPP2 (CDMA) or else TETRA, P25, etc., type standards.

The invention finds a particularly interesting application in the case of PMR (Professional Mobile Radiocommunications) professional radiocommunication networks, and more particularly concerning the use of broadband telecommunication technologies.

In a known manner, each user of a PLMN (Public Land Mobile Network) public mobile telecommunication network currently has an identification module of the SIM (Subscriber Identity Module) card type in which an identifier such as an IMSI (International Mobile Subscriber Identity) identifier is stored. The syntax of the IMSI identifier is described in the ITU-T E.212 standard issued by the ITU (International Telecommunication Union). This public network may be a second generation cellular network of the GSM (Global System for Mobile communications) or GPRS (Global Packet Radio Service) type, a third generation network such as UMTS (Universal Mobile Telecommunications System) networks, or a fourth generation network of the LTE (Long Term Evolution) type defined by the 3GPP (for 3rd Generation Partnership Project) standard.

The IMSI identifier is composed in the following manner:
a 3-digit MCC (Mobile Country Code) code corresponding to the code of the country;
a 2- or 3-digit MNC (Mobile Network Code) code corresponding to the code of the operator;
a 10 or fewer digit MSIN (Mobile Subscriber Identification Number) code corresponding to the number of the subscriber inside the network.

The MCC and MNC codes are allocated statically (cf. ITU-T E 212 for networks of the 3GPP type, ITU-T 218 for networks of the trunk (i.e., TETRA for Trans European Trunked Radio) type or else IEEE for networks of the WiMAX type.

In addition, a user is associated with an operator and has a unique location register better known by the term "HOME." The user may also have several rights of access as a visitor; access as a visitor depends on roaming agreements or on the subscription chosen.

A user identifier (of the IMSI type) may not be common to two countries, since the user identifier contains the MCC/MNC or Operator Id code that is unique at the international level. Therefore, an IMSI code is unique at the international level.

In addition, professional radiocommunication systems called PMR (for "Professional Mobile Radiocommunications") systems of the TETRA (Trans European Trunked Radio) or TETRAPOL type, defined by the industrial forum TETRAPOL (http://www.tetrapol.com) or else of the P25 type defined by the "Telecommunications Industry Association (TIA)" for the "Association of Public-Safety Communications Officers (APCO)" are known. PMR networks are independent mobile communication networks dedicated for the use of companies or administrations, particularly to ensure public safety or industrial safety or to intervene in transport activities. PMR networks are largely utilized by public safety services (police forces and national police, for example) and emergency services, and also by many other user categories (public transport, airports, etc.). These are private networks that present a high level of security. Current PMR networks, based on the technologies cited above, are known as narrowband networks, characterized by a channel width on the order of about ten kilohertz (kHz).

The evolution of telecommunications networks and the rise of high bandwidth encourage PMR systems users to demand applications that are still more advanced, necessitating a higher bandwidth. Consequently, it is important to be able to make PMR systems evolve to the highest broadband widths, for example by implementing a broadband technology (for example of the LTE (Long Term Evolution) or WiMAX (Worldwide Interoperability for Microwave Access) type). Such systems will consequently respond to an identification system defined according to the ITU-T E.212 standard. It follows that an IMSI identifier must be assigned to each user of a PMR network.

More particularly, to be identifiable, a PMR network user must usually have an identifier allowing him to be assigned, on the one hand, a geographical area, such as for example a department for France or a county for the United States, and on the other hand, a user (or national organization) category, such as for example the police, firefighters or ambulances.

For example, in the case of the United States, a PMR network must be divided into a plurality of geographical areas, each geographical area designating a county from among more than 3000 counties forming the American territory. In addition, within each geographical area (constituted by a county for the United States) three categories of users are considered, for example: The police, the army and the firefighters. Consequently, in such an implementation, a minimum of 9000 identifier categories is needed, only enabling sorting per county and per user category. Considering the high number of PMR systems, such a solution for configuring identification seems difficult to consider.

Even though the number of MNC identifiers (for a country defined by an MCC code) would be sufficient, the national administrator probably would not be able to handle the management of such a number of MNC identifiers.

In this context, the invention aims to propose a method of assigning operator identifiers (for example of the MCC/MNC type according to the ITU-T E.212 standard or of the "Operator ID" type in WiMax technology) in a PMR type network by taking the specificities of a PMR type network into account, that are on the one hand, the segmentation of the same service area into geographical sub areas and on the other hand, the multiplicity of user categories on each of the geographical sub areas.

For this purpose, the invention applies to a method of configuring modules for identifying users of a telecommunication network able to cover a service area cut into a plurality of geographical sub areas, each identification module comprising an identification code stored in said identification module, said identification code comprising:

an operator identifier;

a user identification number;

Said method being characterized in that the method comprises a step of assigning at least one operator identifier to each geographical sub area, the operator identifiers of two contiguous geographical sub areas being different and at least two non-contiguous geographical sub areas having an identical operator identifier.

Thanks to the invention, it is possible to use PMR networks with a broadband type technology while responding to the constraints of the ITU-T E212 standard. In fact, according to the method of the invention, the operator identifier is used to cut a service area such as, for example, a country into a plurality of geographical sub areas without requiring a number of operator identifiers equal to the number of geographical sub areas. In fact, thanks to the invention, a same operator identifier is used to designate at least two non-contiguous geographical sub areas. Of course, the reuse rate of a same operator identifier in a same service area depends on both the area of the service area and the engineering of the operator; the reuse rate is preferably equal to or greater than 3.

As an illustration, if we assume that metropolitan France comprises one hundred departments, each comprising five organizations (such as, for example, national police, firefighters, emergency medical service, etc.), the number of operator identifiers to allocate for the French PMR operator would be 500 according to the technologies from the prior art. Example: 100 (departments)×5 (organizations)=500 operator identifiers.

In accordance with the invention, if a reuse rate of operator identifiers of five is used, then the number of operator identifiers necessary is reduced to 100.

In general, the main advantage of the invention consists of allocating a reduced range of operator identifiers (with relation to a static allocation based on an exhaustive sub region and organization list) for a PMR type operator.

According to a particularly interesting embodiment of the method of the invention, said operator identifier comprises:

an MCC identification code of said service area;

an MNC code, at least one MNC code being assigned to each geographical sub area, the MNC codes of two contiguous sub areas being different and at least two non-contiguous sub areas having an identical MNC.

In general, a user has an internationally recognized operator identifier. This operator identifier comprises a PLMNid or operator id (unique MCC+MNC) uniquely defining its "HOME" network. Outside of this "HOME" type PLMNid, the user is always considered to be a "VISITOR." When the user is considered to be a "VISITOR," he will either be refused or accepted. He is accepted if a roaming type agreement exists between the "VISIT" network operator and the operator of his "HOME" network.

Advantageously, the user identification numbers associated with two geographical sub areas having the same operator identifier are chosen in two ranges of separated values. According to this particular embodiment, cutting of the user identification number into ranges of values enables an identification module having an operator identifier assigned to two geographical sub areas to be identified for sure.

In addition to the principal characteristics that have just been mentioned, the method of configuring modules for identifying users of a telecommunication network according to the invention may present one or more of the additional characteristics below, considered individually or according to all technically feasible combinations:

said MNC code comprises at least three digits;

within a same geographical sub area, in case of a plurality of user categories, a different MNC code is associated with each user category;

said operator identifier comprises an "Operator Id" type identifier;

the minimum reuse rate of a same operator identifier in a same service area is equal to or greater than 2 and preferentially equal to or greater than 3;

said telecommunication network is a PMR network;

said method comprises a step of assigning an operator identifier that is temporarily reusable for different missions. This advantageous embodiment enables, for example, a plurality of user categories to temporarily share a same MNC code, typically the police and firefighters acting together on a temporary mission; in this case the reuse algorithm of an MNC value is allocated in a floating manner (i.e., a MNC may be utilized two days apart by different organizations in a different place for two different missions decided on by the PMR operator).

said identification code stored in said identification code responds to a syntax such as defined in one of the following standards:

ITU-T E212;

ITU-T E218; or

IEEE.

Another object of the present invention is a user terminal comprising an identification code configured by a method in conformance with the invention.

Other characteristics and advantages of the invention will clearly emerge from the description given below, for indicative and in no way limiting purposes, with reference to the attached figures, among which:

Figure 1:
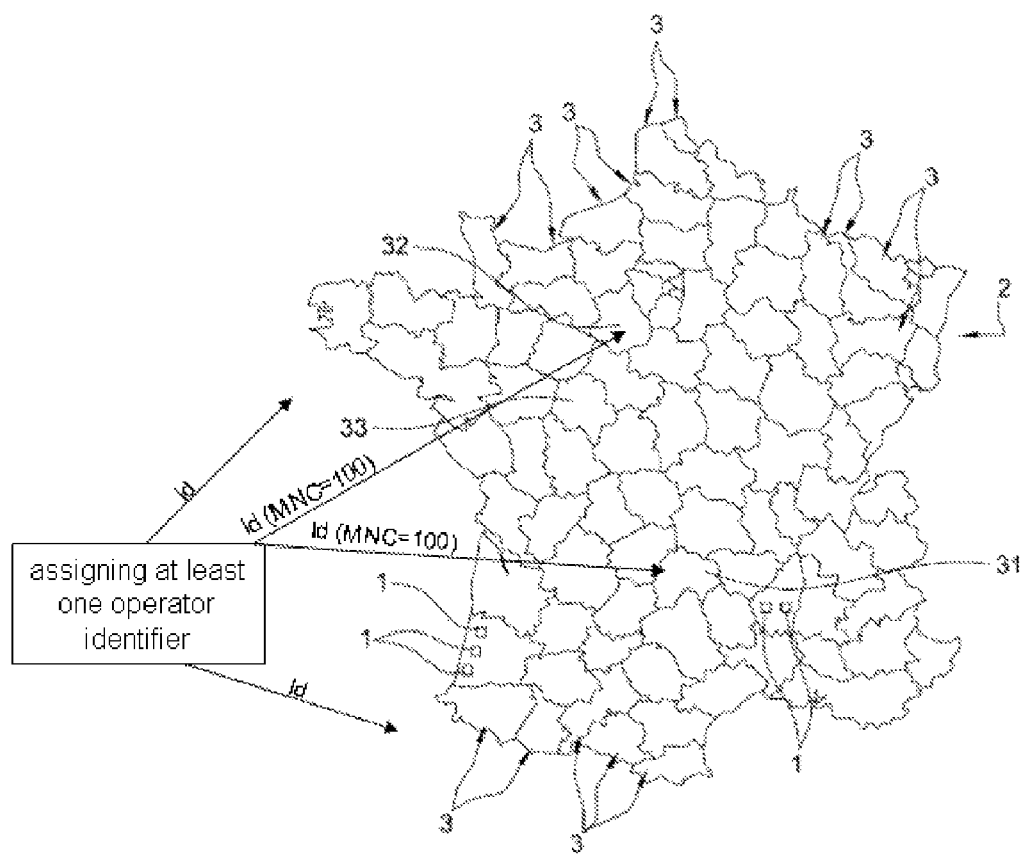
FIG. 1 represents a service area cut into several geographical sub areas.
Figure 2:
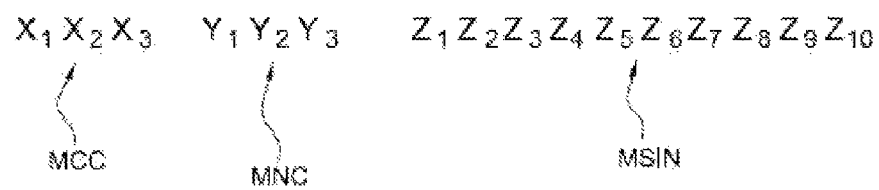
FIG. 2 represents an IMSI code configured by a method according to the invention.

The invention illustrated in FIGS. 1 and 2 applies to a method of configuring modules 1 for identifying users of a telecommunication network able to cover a service area 2. In the example from the description, this service area 2 is formed by the French territory. The French territory is cut into a plurality of geographical sub areas 3. In the example, each geographical sub area 3 is formed by a department.

Each telecommunication network user comprises an identification module 1 comprising a particular identification code. This identification code is stored in the identification module 1. By way of a non-limiting example, for the rest of the description the identification code is formed by an IMSI identification code whose syntax responds to the ITU-T E.212 standard issued by the ITU (International Telecommunication Union).

The structure of the IMSI identification code is represented in FIG. 2. The IMSI identification code comprises:

a 3-digit MCC identification code corresponding to service area 2 that designates a country in the example; the MCC code may be formed of three digits such as 001;

a 2- or 3-digit (preferentially three in the case of the method according to the invention) MNC code. This MNC code is assigned to a PMR type operator who has a range of MNC codes allocated by a national administrator. This range is proprietarily managed by the PMR type operator, over its geographical areas and for its organizations;

a 10 or fewer digit identification number (or code) of the MSIN user.

The method of the invention comprises a step of assigning an MNC code to a user category within a geographical sub area 3. By way of example, the MNC code assigned for a user situated in the geographical sub area 31 of Aveyron is formed by the number 100 and the MNC code assigned for a user situated in the geographical sub area of Yvelines is formed by the number 100. Thus, the user situated in geographical sub area 32 of Yvelines may be identified by means of a same MNC code as the user situated in geographical sub area 31 of Aveyron. It will be noted that these users may belong to a same category or to different categories.

It should also be noted that a plurality of user categories is found within each geographical sub area 3. For example, a first user category designates the police and a second user category designates the firefighters.

Because of this, the method of configuring modules 1 for identifying users of a telecommunication network may authorize the assigning of a same MNC code for the police of geographical sub area 32 of Yvelines and for the police of geographical sub area 31 of Aveyron or else a same MNC code for the police of geographical sub area 32 of Yvelines and for the firefighters of geographical sub area 31 of Aveyron. This particularity enables the number of MNC codes necessary for identifying all identification modules 1 to be reduced.

In every case, two identical MNC codes are not reused in two contiguous geographical sub areas 3, which prevents a high rate of authentication failures at the borders of the geographical sub areas. In other words, this characteristic prevents confusion when a user from geographical sub area 3 moves to a contiguous geographical sub area 3.

In addition, each user of the network must remain uniquely identifiable. To do this, one takes advantage of the fact that the number of PMR network users is rather low compared to the number of users of public type networks. According to the method of the invention, the MSIN code is divided into a range of values. Thus, according to the method, two users situated in two non-contiguous geographical sub areas comprising a same MNC code each have an MSIN code necessarily chosen from the ranges of separated values. So, a user usually situated in geographical sub area 32 of Yvelines who is occasionally found in geographical sub area of Aveyron surely will be identified by means of his MSIN code as not being part of geographical sub area 31 of Aveyron.

In other words, for two non-contiguous geographical areas 3 with a same MNC code, each MSIN code is chosen in the separated value ranges.

According to a variant of the method of the invention, the latter also enables an MNC code that is temporarily reusable for different missions to be assigned.

According to such an implementation, during a traffic accident, an MNC code may be temporarily assigned for an emergency intervention mission in which different user categories intervene, these different user categories may come from different geographical sub areas 3. This MNC code is subsequently called a "floating" code.

By way of example, two police officers from geographical sub area 32 of Yvelines and two firefighters from geographical sub area 31 of Aveyron may intervene during a same intervention mission situated in another geographical sub area 33 of Indre et Loire. A unique MNC code is then assigned for each temporary mission. It should be noted that each user remains identifiable by means of the IMSI code. All users intervening in this temporary mission are considered to be visitors. Each user that intervenes in the mission then has an IMSI code particular to and attached to a network using an MNC code different from that entered in his own identity defined by the IMSI code.

According to such an implementation, since the user is found outside his geographical area, he is considered to be a visitor.

Generally, when a user is connected to a PLMN mobile public telecommunication network situated outside his geographical sub area 3 he is either refused or accepted. To be accepted, the user must have obtained a prior roaming type interoperator mobility agreement with the operator of the public telecommunication network where he is situated.

Similarly, to be accepted by a PMR type network, a user considered to be a visitor by this same PMR network must have access rights (this type of access rights depends on the existence of roaming agreements within the PMR network).

In addition, certain organizations (such as, for example, GIGN (National Gendarmerie Intervention Group)) with inherent mobile and temporary missions not associated with a given geographical sub area will always have their users associated as "HOME" users with this MNC code known as a "floating" code for each mission. In this case, their MNC code, known as a floating code, may be reused later for another mission.

The invention is described above by way of example; it is understood that the person skilled in the art is able to carry out different variants of the method of configuring modules for identifying users of a telecommunication network, in particular concerning the type of identification code.

The invention claimed is:

1. A method of configuring identification modules for identifying users of a telecommunication network able to cover a service area cut into a plurality of geographical sub areas, each identification module comprising an identification code stored in said identification module, said identification code comprising:
    an operator identifier;
    a user identification number;
    the method comprising assigning at least one operator identifier to each geographical sub area, the operator identifiers of two contiguous geographical sub areas being different and at least two noncontiguous geographical sub areas having an identical operator identifier.

2. The method according to claim 1, wherein said operator identifier comprises:
    an MCC identification code of said service area;
    an MNC code, at least one MNC code being assigned to each geographical sub area, the MNC codes of two contiguous sub areas being different and at least two noncontiguous sub areas having an identical MNC code.

3. The method according to claim 2, wherein within a same geographical sub area, in case of a plurality of user categories, a different MNC code is associated with each user category.

4. The method according to claim 2, wherein said MNC code comprises at least three digits.

5. The method according to claim 1, wherein said operator identifier comprises an "Operator Id" type identifier.

6. The method according to claim 1, wherein the identification numbers of users associated with two geographical sub areas having the same operator identifier are chosen in two ranges of separated values.

7. The method according to claim 1, wherein the minimum reuse rate of a same operator identifier in a same service area is equal to or greater than 2.

8. The method according to claim 7, wherein the minimum reuse rate is equal to or greater than 3.

9. The method according to claim 1, wherein said telecommunication network is a PMR network.

10. The method according to claim 1, comprising assigning an operator identifier that is temporarily reusable for different missions.

11. The method according to claim 1, wherein said identification code stored in said identification code responds to a syntax such as defined in one of the following standards:
   ITU-T E212;
   ITU-T E218; or
   IEEE.

12. A user terminal comprising an identification code configured by a method according to claim 1.

* * * * *